United States Patent Office 3,573,089
Patented Mar. 30, 1971

3,573,089
METHOD OF MANUFACTURING SCREEN CLOTHS FOR PAPERMAKING
Takuo Tate, Tokyo, Japan, assignor to Kabushiki Kaisha Sayama Seisakusho, Tokyo, Japan
No Drawing. Filed Oct. 12, 1967, Ser. No. 674,743
Claims priority, application Japan, Nov. 15, 1966, 41/74,636
Int. Cl. D21f 1/10
U.S. Cl. 117—72
16 Claims

ABSTRACT OF THE DISCLOSURE

A novel method of manufacturing a papermaking screen cloth having a hydrophilic coating is described. The method consists of applying to the surface of the warps and wefts of the screen cloth a solution of at least one water soluble organic compound containing at least two hydrophilic groups, at least one of the hydrophilic groups containing an active hydrogen atom, and a condensing agent capable of reacting with the active hydrogen of the hydrophilic groups, whereby the condensing agent reacts with the hydrophilic groups and part of the hydrophilic groups remains unreacted and forms a hydrophilic film on the surface of the screen cloth.

---

This invention relates to a method of manufacturing screen cloths for papermaking, that is, Fourdrinier wire, water-squeezing felt, drying canvas and other screen cloths for papermaking and the like processes. The process according to the present invention comprises coating the surface of warps and wefts of screen cloths with a hydrophilic substance thereby improving the wettability, water absorption and water permeability, preventing pollution with oil and grease, and other resinous substances, imparting a lubricating quality to the cloth surface, and protecting the cloths against wear due to vigorous friction.

Screen, canvas, and felt which have hitherto been used as screen cloths for paper machine have only short life because of wear and pollution.

Wire screens of metallic wires are quick to be worn and broken away by vigorous friction with suction boxes. Synthetic resin screens by nature tend to attract resinous contents of stock and the meshes are easily packed up with pitch and other resinous impurities mixed in the stock, with the result it becomes impossible to make paper of uniform quality and the life of screen is shortened by breaking of wires. Moreover, synthetic resins themselves are not affinitive to water and have only limited effects of filtering water out of the stock. Because of the poor effects of water removal, synthetic resin screens have been barred from use on high-speed machines and for the manufacture of thin papers.

Exactly the same applies to felt and canvas. Unclean felt has a sharply reduced water-squeezing effect and, because of the soft and flexible structure, it is readily made fuzzy and worn out by friction. As for canvas, pollution will deprive it of the drying effect and of the ability of flattening paper, and will even invite breakdown of web. The same can also be said of fabrics of reticular structure which may be used as substitutes for felt or canvas.

The present invention eliminates the foregoing disadvantages of conventional screen and cloths for papermaking and provides a method of manufacturing screen and cloths having better functions and advantages.

More specifically, the present invention relates to a method of manufacturing screen fabrics for papermaking which comprises coating the surface of the warp and weft of screen cloth with a water-soluble hydrophilic substance having hydrophilic groups and a condensing agent reactive with the hydrophilic substance, thereby permitting the condensing agent to bond said hydrophilic substance to the surface of the screen cloth so as to form a hydrophilic film over the surface of said screen cloth.

Also, the present invention relates to a method of manufacturing screen cloths for papermaking which comprises coating the surface of the warp and weft of screen cloth with a water-soluble hydrophilic substance which has at least two hydrophilic groups containing active hydrogen and a condensing agent reactive with said active hydrogen and, where necessary, an adhesive resin, thereby permitting the condensing agent to bond the active hydrogen of a hydrophilic group or groups from which at least one of the hydrophilic groups has been excepted, of said hydrophilic substance to the surface of the screen cloth so as to form a hydrophilic coated film over the surface of said screen cloth.

Further, the present invention relates to a method of manufacturing screen cloths for papermaking which comprises coating the surface of the warp and weft of screen cloth with a water-soluble substance which contains at least one hydrophilic group having active hydrogen and at least one hydrophilic group having no active hydrogen and a condensing agent reactive with active hydrogen, thereby permitting the condensing agent to bond the active hydrogen of the hydrophilic substance to the surface of screen cloth so as to form a hydrophilic coated film over the surface of said screen cloth.

In the present invention, the object of allowing a hydrophilic film to be present over the surface of the yarns or element wires which constitute the screen or cloths, lies in imparting good water filterability, pollution resistance, wear resistance and lubricant property to the cloths for use in various stages of papermaking process, for example to the screen for the wet end, giving a good drainability, pollution resistance, and washability to the cloths for the press section, and giving satisfactory vapor dischargeability, pollution resistance and antistatic property to the cloths for the drying section. By the use of such screen cloths, the papermaking rate is improved and production of good-quality paper is made possible.

The method of forming a hydrophilic group coated film over the warp and weft surface of the screen cloth in accordance with the present invention will now be explained in more detail hereunder. In one procedure, a substance having two or more active hydrogen atoms is employed as the hydrophilic substance, and a condensing agent reactive with the active hydrogen is used in an amount enough to react with part of the active hydrogen, and then the above substance is bonded to the surface of screen cloth.

In the above procedure, the reason for which a water-soluble substance having at least two active hydrogen-containing hydrophilic groups is employed is that, as one of the active hydrogen groups of the hydrophilic substance is condensed by the condensing agent onto the surface of screen cloth thereby to form a coated film of hydrophilic substance, at least one hydrophilic group remains uncondensed and maintains the hydrophilic property to an advantage.

If a substance having only one active hydrogen-containing hydrophilic group, for example a monovalent alcohol or monobasic acid, is used, the active hydrogen group is condensed by the action of the condensing agent and loses the hydrophilic property, with the result that the coated film formed becomes hydrophobic. For this reason, the present invention is not applicable to such substances but only to the hydrophilic substances having two or more hydrophilic groups.

For the purpose of the invention, the term active hydrogen means highly reactive hydrogen which forms part of hydrophilic groups such as —OH, —COOH, —SO$_3$H, —OSO$_3$H, —NH$_2$, and —SH.

As compounds having two or more hydrophilic groups which contain such active hydrogen, the compounds of the following types are used:

Polyvalent alcohols and derivatives, sulfonates, and sulfates thereof represented by ethylene glycol, glycerine, and sorbitol; organic acids having double bonds and derivatives, sulfonates and sulfates represented by acrylic acid and maleic acid; fatty acids and derivatives and sulfonates thereof represented by lauric acid; polybasic acids represented by oxalic acid and succinic acid; oxycarboxylic acids and sulfonates and sulfates thereof represented by glycolic acid and glyceric acid; and amine compounds such as aminomethanesulfonic acid.

As the condensing agents for bonding these hydrophilic substances to screen cloth surface, any polyfunctional substances reactive with active hydrogen may be used. Above all, cross-linking condensing agents for thermosetting resins give particularly good results. From the standpoint of processability, formaldehyde, polyisocyanates, and polyamines are suitable for the method of the invention above described.

Another variation of the method of the invention consists of employing a substance having one or more hydrophilic group with active hydrogen and one or more hydrophilic group which is free from active hydrogen as a hydrophilic substance, and bonding said substance to the surface of screen cloth with a condensing agent which is reactive with active hydrogen.

In the method, the water-soluble hydrophilic substance having hydrophilic groups with or without active hydrogen both in amounts of one or more is used because, even after the removal by condensation of active hydrogen by the condensing agent reactive with active hydrogen, the hydrophilic group free from active hydrogen remains uncondensed and maintains the hydrophilic property. Hydrophilic substances having only active hydrogen-containing hydrophilic groups lose their hydrophilic property when completely deprived of their active hydrogen by the condensation reaction. This variation of the method of the invention has no such disadvantage and ensures easy operation for preparing the composition.

In this variation of the method, the term active hydrogen is used, in the same way as in the preceding variation, to means highly reactive H such as —OH, —COOH, —SO$_3$H, —OSO$_3$H, —NH$_2$, and —SH. Hydrophilic groups free from active hydrogen means the hydrophilic groups which exhibit hydrophilic property usually as alkali salts such as —SO$_3$Na, —OSO$_3$Na, and —COONa.

Compounds having both hydrophilic groups having and not having active hydrogen are available in numerous varieties in the form of combinations of derivatives formed by all types of synthetic reactions. By way of example, typical of such compounds may be mentioned as follows:

Partial sulfonates or sulfates of polyvalent alcohols and derivatives thereof represented by ethylene glycol, glycerine, and sorbitol; sulfonates and sulfates of organic acids and derivatives thereof represented by acrylic acid and maleic acid; sulfonates of fatty acids and derivatives thereof represented by acetic acid and lauric acid; partial alkali salts of polybasic acids and derivatives thereof represented by oxalic acid and succinic acid; sulfates, sulfonates and alkali salts of oxycarboxylic acids represented by glycolic acid and glyceric acid; and amine compounds represented by aminomethanesulfonic acid.

In this latter variation of the method according to the invention, any polyfunctional substance reactive with active hydrogen may be used as the condensing agent, just as in the former procedure. Cross-linking condensing agents as employed for thermosetting resins may also be used selectively.

Especially from the standpoint of processability, formaldehyde, polyisocyanates, and polyamines are effective and useful for this variation of method as well.

As described above, the present invention has for its object provision of screen cloths for use on paper machines or for use in removal and squeezing of water from stock in processes similar to the paper manufacture, which are coated or impregnated on the surface with a hydrophilic substance, which are also chemically combined with the screen cloth surface, whereby the cloths are remarkably improved in water filtering, squeezing, and drying effects and are protected against pollution with resinous contents of stock and against wear due to friction. These effects which can be achieved and the method of treating with hydrophilic substances in accordance with the present invention will be described below in connection with wires or screens for papermaking as an example.

Screens for papermaking are formed of wires of metals or synthetic resins as above noted. The present invention is applicable to both with excellent effects. In case of a metallic screen, it is driven at a high speed while being subjected to vigorous friction with suction boxes and other rolls and, moreover, the screen material is usually very susceptible to the friction. Therefore, the screen is worn away within a short period of time. Synthetic resin screen is soft and flexible, and particularly the screen woven of textile fibers has such defects as excessive elongation, widthwise contraction, creasing and deformation of texture and is unusable without further processing. It is then advisable to introduce a hydrophilic substance by using a resin or one particularly adhesive to such metallic or synthetic resin screen. In general synthetic resins are abrasion-resistant and a coated film of such synthetic resin on the surface of a metallic screen can prevent wear of the screen and make the latter highly acid-resistant. On the other hand, syntheic resin screen can be freed from the above-mentioned defects by the impregnation or coating with a synthetic resin as above described. Warps and wefts are thereby bonded to each other at intersections for protection against texture deformation, and filaments are impregnated and bound together for increased wear resistance, and stiffness is imparted to the screen as a whole in order to prevent excessive elongation, widthwise contraction, and crease development. However, mere coating with synthetic resin may make the screen hard to moisten because of the hydrophobic property of synthetic resin.

Also, because such screen lacks so-called filterability or the ability of passing water therethrough from the stock on the screen, removal of water for which the screen for papermaking is intended is not satisfactorily accomplished. In addition, synthetic resin is highly affinitive to pitch and other resins mixed or present in the stock and tends to attract those impurities onto the screen surface, with the result that the meshes are gradually packed up until paper forming is rendered totally impossible. Thus, mere coating of the screen is not effective in the least for the purpose of papermaking.

Accordingly, according to the invention, a coated film of hydrophilic resin is formed directly or indirectly on such metallc and synthetic resin screen for such effect.

As the method for realizing the above object of the invention, where the element wires of synthetic resin screen are formed of a highly reactive material, the screen surface is first coated and bonded with a condensing agent so that the reactive material can react with at least one of the active hydrogen-containing groups of a hydrophilic substance, and the hydrophilic substance is applied thereon, and then the hydrophilic substance is bonded to the screen surface with or without the application of heat. Alternatively, a solution prepared beforehand by mixing such hydrophilic substance with a condensing agent in a calculated amount enough for permitting at least one of the hydrophilic groups of the hydrophilic substance to remain unreacted, may be applied directly to such synthetic resin material thereby to finish the screen.

In reality, as above described, the present invention can be rendered all the more effective by giving a coated film of hydrophilic substance to the synthetic resin through combined use of an adhesive synthetic resin suitable for the paper-forming conditions of the synthetic resin screen, particularly of textile screen or metallic screen.

For example, it is possible to apply a mixture of an adhesive synthetic resin with a condensing agent to such screen, and then apply a hydrophilic substance onto the coat of the mixture thereby to bond the hydrophilic substance to the screen by the action of the condensing agent. At this time, if the adhesive resin used is reactive with the condensing agent, an even more powerful bond will result and a more durable hydrophilic coated film will be formed. It is also possible to coat the screen surface beforehand with an adhesive resin having active group, couple the resin with a condensing agent, and then apply a hydrophilic substance onto the screen so that it can be bonded as desired, or coat the screen with a mixture of such condensing agent and hydrophilic substance and thereby effect the bonding. In either case, it is essential according to the present invention to limit the percentage of the condensing agent to be added so that at least one of the hydrophilic groups of the hydrophilic substance can remain unreacted or to use, instead, a hydrophilic substance having hydrophilic groups which are free from active hydrogen. Otherwise the present invention will lose the significance because no hydrophilic coated film results.

The method of the invention is not only applicable to screen cloths to be woven of hydrophilic materials but may be adopted with no less effect for screen cloths which are to be woven of element wires or filaments treated beforehand.

The adhesive resins to be used for the above purpose in accordance with the present invention include almost all adhesive resins, though the applicability depends on the type of element wires or filaments of the screen to be treated, and may be suitably selected from among polyamides, polyester, polyurethanes, polyvinyl chloride, polyvinly alcohols, epoxy resins, xylene, phenol resins, melamine resins, urea resins, alkyd resins, rubber, and the like.

The screen obtained by the method of the invention as above described is improved in the wetting, filtering, and dehydrating characteristics without any adverse effect upon the properties of the material forming the element wires or filaments, and permits sufficient squeezing of water from the stock at a high speed, thus rendering efficient papermaking possible. The phenomenon of high wettability is attributed to the adsorption of water particles by the hydrophilic group contained in the hydrophilic substance, which makes the surface of element wires or filaments as if covered with water molecules and thereby facilitates penetration of water through the screen. Moreover, because the element wires or filaments of the screen are coated with water molecules in the foregoing way, pitch and other resinous contents of the stock are kept from direct contact with the screen surface and naturally the screen is kept clean without deposition of such impurities. Further, the presence of the water film between the screen and suction boxes serves to provide lubrication for the contacting faces thereof. As the result, the screen is protected against abrasion and the continuous use of the screen for an extended period of time is made possible. Moreover, the water film improves the releasability of the web formed on the screen as the web is couched onto a subsequent processing stage. It enables the web to be transferred smoothly without being torn up or made fuzzy.

Although the present invention has so far been described as regards wire screens for use on paper machines, it is of course applicable to other sections as well.

Next, the present invention will be described as applied to felt for the press section. Originally felt is intended to absorb water pressed out of a web and thereby dehydrate the web, taking advantage of the capillary action of the dense fiber layer and by the action of compression and expansion of the structure. If the felt is rendered hydrophilic by the method of the invention, the water absorption effect is increased due to the high affinity to water acquired in the capillary action, and thus water absorption from the wet web can be accomplished in a perfect way. Moreover, in the stage of squeezing of felt for removal of the water absorbed, the felt can easily give off the water, reproducing the effect of ready water absorption from the wet web. The present invention makes it possible to use felt of synthetic fibers which are hydrophobic and strong in structure in place of conventional felt of weak structure which is formed of cotton fibers in order to maintain a satisfactory water absorption effect. Thus, continuous use of the felt is possible for long, and the papermaking efficiency can be redoubled.

Further, as already explained in connection with the screen for the wet end, the possibilities of pollution and abrasion due to insufficient lubrication are precluded and the life of the felt is accordingly prolonged.

With respect to drying canvas, the advantages of the present invention as applicable to the felt and the screen for the wet end are pronounced also with canvas. Since the presence of the hydrophilic group ensures good water and gas permeability of the canvas, water vapor from the wet web can be thoroughly dissipated and the drying effect is largely enhanced, thus realizing a speed-up or shortening of the drying process.

As described hereinabove, the present invention is not only applicable to screen cloths for use on paper machine to great advantages, but it can also be adopted in other processes for water treatment as in papermaking.

The method of the invention has very extensive applications in that the materials to be thereby treated includes wires, filaments and screen cloths of metals, synthetic resins, and artificial and natural fibers. These materials treated in accordance with the present invention exhibit very effective actions when used as screen cloths for papermaking.

EXAMPLE 1

An endless screen having a texture of 25 yarns per 25.4 mm. woven of 630-denier twisted yarn of polyamide fiber was spread flat. It was coated with a 20% methyl ethyl ketone solution prepared by adding 10 parts of diaminodiphenylmethane and 5 parts of urethane triisocyanate obtained from tolylene diisocyanate and trimethylol propane to 100 parts of epoxy resin with an epoxy equivalent of 500, heated at 120° C. for 2 minutes. Then, the screen was coated with a 50% methyl ethyl ketone solution of a 1:1 mixture of diethylene glycol and glycerine, heated at 170° C. for 3 minutes, and washed with water.

The screen treated in this way was smooth and hard on the surface and stabilized in dimensions with no possibility of elongation. In an experiment for making cardboard, it proved to possess very good water filterability, remained unstained by pitch, gum, and the like, and enabled the board to be formed satisfactorily.

EXAMPLE 2

An endless screen of a texture of 60 bronze wires per 25.4 mm. was stretched flat, coated with a solution prepared by adding 3 parts of polyethylene glycol having a molecular weight of 400 to a 15% aqueous solution of melamine-formaldehyde resin, and heated at 160° C. for 15 minutes. The screen thus obtained had very good water filterability as the metallic element wires were completely covered with the melamine resin.

An abrasion test showed that it was 3.5 times as strong as untreated screen and was capable of prolonged use.

EXAMPLE 3

An endless screen of a texture of 60 bronze wires per 25.4 mm. was stretched flat and was driven. While it was running, the screen was coated with a 15% methyl ethyl ketone solution prepared by adding 15 parts of diaminodiphenylmethane and 5 parts of urethane triisocyanate obtained from tolylene diisocyanate and trimethylol propane to 100 parts of epoxy resin with an epoxy equivalent of 400, and heated at 120° C. for 2 minutes. Next, it was coated with a mixture of triethylene glycol and sodium salt of monoadipic ester, heated at 170° C. for 3 minutes, and washed with water.

The screen thus obtained was coated with the synthetic resin on the surface and was highly wear-resistant and water permeable. When used for papermaking purpose, the screen showed a very good water filtering effect and improved the papermaking efficiency. Moreover, it was kept clean from pitch and other impurities of the stock and proved serviceable for long.

EXAMPLE 4

An endless screen having a texture of 40 of 420-denier polyamide twisted yarn per 25.4 mm. was coated with a solution prepared by mixing 3 parts of ethylene glycol-sodium monosulfonate to 100 parts of a 10% aqueous solution of melamine-formaldehyde resin, and heated at 150° C. for 10 minutes while it was kept flat.

The screen obtained in this way was stiffened with the resin, with the texture secured undeformably, and maintained its non-creasing stable posture when fitted to a press of paper machine.

When a wet web was received from the wire section and pressed with press rolls, the water squeezed out was allowed to pass immediately through the screen because of the good water absorption and water permeability of the screen. Thus, a perfect press effect was attained.

The fibers constituting the screen showed no sign of wear due to friction and the screen could be used with no possibility of pitch deposition.

I claim:
1. A method of manufacturing a papermaking screen cloth having a hydrophilic coating, which comprises applying to the surface of the warps and wefts of the screen cloth a solution of at least one water soluble organic compound containing at least two hydrophilic groups and at least one of said hydrophilic groups containing an active hydrogen atom, and a condensing agent capable of reacting with the active hydrogen of the hydrophilic groups, whereby the condensing agent reacts with the hydrophilic groups and part of the hydrophilic groups remains unreacted and forms a hydrophilic film on the surface of the screen cloth.

2. The method according to claim 1 wherein part of the hydrophilic groups of said organic compound contains active hydrogen and reacts with said condensing agent and part of the hydrophilic groups are free of active hydrogen, remain unreacted and form a hydrophilic film on the surface of the screen cloth.

3. The method according to claim 2 wherein said organic compound contains at least two active hydrogen atoms and the condensing agent is used in amount sufficient to react only with part of the active hydrogen.

4. The method according to claim 2 wherein said active hydrogen is part of a group which is a member selected from the group consisting of —OH, —COOH, —SO$_3$H, —OSO$_3$H, —NH$_2$ and —SH.

5. The method according to claim 1 wherein said condensing agent is formaldehyde or a polyamine or a polyisocyanate.

6. The method according to claim 2 wherein said hydrophilic group not containing active hydrogen is —COONa or —SO$_3$Na or —OSO$_3$Na.

7. The method according to claim 2 wherein a compound containing hydrophilic groups only part of which contains active hydrogen, is used and said compound is a member selected from the group consisting of (1) incompletely sulfated or sulfonated polyvalent alcohols, (2) sulfonates and sulfates of saturated and unsaturated mono- and dicarboxylic acids, (3) polycarboxylic acid monoalkali salts, (4) sulfonates, sulfates and alkali salts of hydroxycarboxylic acids and (5) aminosulfonic acids.

8. The method according to claim 1 wherein the screen is coated with a mixed solution of a synthetic resin, the condensing agent and said hydrophilic compound.

9. The method according to claim 1 wherein the screen is first coated with a mixed solution of a synthetic resin and a condensing agent, and in a second step with the hydrophilic compound.

10. The method according to claim 1 wherein the screen is first coated with a synthetic resin, and in a second step with a mixed solution of the condensing agent and the hydrophilic compound.

11. The method according to claim 1 wherein the screen is first coated with a solution of synthetic resin and then with a condensing agent and finally with the hydrophilic compound.

12. A method according to claim 1, which further comprises heating the screen cloth coated with the synthetic resin, the hydrophilic compound and the condensing agent.

13. The method according to claim 1 wherein the synthetic adhesive resin is a member selected from the group of polyamides, polyesters, polyurethanes, polyvinyl chloride, polyvinyl alcohol, epoxy resins, phenol resins, melamine resins, urea resins, alkyd resins, and rubber.

14. The method according to claim 1 wherein the synthetic resin reacts with said condensing agent and the hydrophilic film formed on the screen has additional durability.

15. The method according to claim 1 wherein the condensing agent is a urethane triisocyanate prepared from tolylene diisocyanate and trimethylol propane, the resin is an epoxy resin or melamine-formaldehyde resin, the hydrophilic substance is diaminodiphenylmethane or diethylene glycol or glycerol or a mixture of triethylene glycol and the sodium salt of a monoester of adipic acid or ethylene glycol sodium monosulfonate.

16. A screen cloth for papermaking wherein the warps and wefts of the screen are coated with a hydrophilic film, prepared by the process of claim 1.

References Cited

UNITED STATES PATENTS

| | | | |
|---|---|---|---|
| 2,992,469 | 7/1961 | Hose et al. | 117—99UX |
| 3,140,222 | 7/1964 | Michalski et al. | 117—99X |
| 3,150,035 | 9/1964 | Eddy | 117—99X |
| 3,175,792 | 3/1965 | Smallian | 117—99UX |

RALPH S. KENDALL, Primary Examiner

U.S. Cl. X.R.

117—75, 98, 99; 162—199, 348